United States Patent [19]
Vawter et al.

[11] Patent Number: 5,627,929
[45] Date of Patent: May 6, 1997

[54] INTEGRATED OPTICAL XY COUPLER

[75] Inventors: G. Allen Vawter; G. Ronald Hadley, both of Albuquerque, N.M.

[73] Assignee: Sandia Corporation, Albuquerque, N.M.

[21] Appl. No.: 435,023

[22] Filed: May 4, 1995

[51] Int. Cl.$^6$ ........................................... G02B 6/26
[52] U.S. Cl. ........................... 385/45; 385/2; 385/3; 385/14; 385/15; 385/16; 385/42; 385/40; 385/131; 385/132
[58] Field of Search ........................... 385/2, 3, 8, 9, 385/14, 15, 16, 24, 40, 42, 45, 46, 131, 132

[56] References Cited

U.S. PATENT DOCUMENTS

| | | | |
|---|---|---|---|
| 3,920,314 | 11/1975 | Yajima | 385/28 X |
| 4,674,827 | 6/1987 | Izutsu et al. | 385/45 X |
| 4,747,654 | 5/1988 | Yi-Yan | 385/37 X |
| 4,846,540 | 7/1989 | Kapon | 385/132 X |
| 4,952,018 | 8/1990 | Young et al. | 385/28 X |
| 5,224,193 | 6/1993 | Risk | 385/28 X |

*Primary Examiner*—Brian Healy
*Attorney, Agent, or Firm*—Gregory A. Cone

[57] ABSTRACT

An integrated optical XY coupler having two converging input waveguide arms meeting in a central section and a central output waveguide arm and two diverging flanking output waveguide arms emanating from the central section. In-phase light from the input arms constructively interfers in the central section to produce a single mode output in the central output arm with the rest of the light being collected in the flanking output arms. Crosstalk between devices on a substrate is minimized by this collection of the out-of-phase light by the flanking output arms of the XY coupler.

9 Claims, 5 Drawing Sheets

INTEGRATED OPTICAL XY COUPLER

The Government has rights in this invention pursuant to contract No. DE-AC04-76DP00789 awarded by the U.S. Department of Energy.

BACKGROUND OF THE INVENTION

This invention relates to modulating optical signals in waveguides. More particularly this invention relates to an integrated Mach-Zehnder Interferometer (MZI) design which employs a particular optical coupler at the point where the MZI arms recombine that steers a light beam into a central output waveguide if the beams entering the coupler are in phase and steers the light which is not in phase into two diverging output waveguides that flank the central output waveguide. Phase modulators in at least one arm of the MZI control the phase matching in the coupler and the output of the central output waveguide.

Compact, low-cost photonic integrated circuits (PICs) have long been a desire of systems engineers. Unfortunately, the majority of PICs in use today use regrown buried heterostructure waveguides to achieve low crosstalk at reasonable packing density. These regrown structures are very expensive and limit PIC applications to high performance niches. The alternative low-cost approach is to use etched-rib, or strip-loaded, waveguides. Strip-loaded waveguides are simple to manufacture but may have guided slab-modes carrying unwanted light between devices within the PIC. These slab modes can result in very high crosstalk or low device density. In addition, some devices such as Mach-Zehnder interferometers and waveguide power couplers generate radiation into slab modes as a fundamental means of operation. These strip-loaded waveguide PICs have been of limited utility due to the exceedingly high crosstalk between optical elements. This crosstalk results from the existence of slab-type optical waveguide modes outside the actual strip waveguide. Attempts to eliminate crosstalk by etching away the unwanted slab waveguide material results in highly overmoded mesa isolated waveguides. These mesa isolated structures can be useful if care is taken not to couple light into the higher-order modes. Nevertheless, problems arise when using a standard y-junction waveguide power coupler with this sort of structure since this device operates by coupling all out-of-phase light into radiation modes so that it can leave the optical circuit. When using multi-mode mesa isolated strip-loaded waveguides, the y-junction also couples light very strongly into the higher-order modes of the mesa structure. This light is then free to propagate along the mesa such that it is difficult to distinguish from light in the guided rib mode. Light guided by the mesa may also couple, by means of scattering, back into the strip waveguide. Both phenomena cause a dramatic reduction in contrast ratio or modulation depth.

An example of a conventional etched-rib waveguide implementation of an MZI with a standard Y-coupler is shown is FIG. 1. Light enters the MZI section 10 from an input rib waveguide 18 and splits along the two arms 13 and 15, passing through the two phase shifters 16 into the Y-coupler 14. The light entering the Y-coupler 14 will either preferentially couple into the output waveguide 20 if the light coming out of the two arms 13 and 15 is in phase or will couple, if out of phase, into the slab as higher order modes or will radiate as shown by the arrows 22. This radiated light is forced to couple into either substrate modes, air modes, or one-dimensionally guided slab-waveguide modes supported by high-refractive-index material remaining at the upper surface of the semiconductor after the etched rib is formed. The bulk of the light radiated out of the rib waveguide couples into the slab waveguide, if present, allowing for crosstalk between adjacent waveguides. Thus, the out of phase light component is responsible for the undesirable cross talk between other devices on a PIC when conventional Y couplers are used. Furthermore, light coupled into the slab waveguide by a conventional Y coupler can reduce the MZI contrast ratio (on-off ratio) if it does not propogate away from the output rib waveguide 20 sufficiently and therefor is allowed to partially couple into other optical elements of the PIC (such as an an optical fiber, detector or cascaded waveguide switch).

SUMMARY OF THE INVENTION

The failings of the prior art optical couplers are cured by the XY coupler of this invention in which two additional arms are added to the output side of the conventional Y coupler. The resulting XY coupler, best visualized as an X superimposed onto the Y coupler, captures the out of phase light in these two additional output arms that flank the central arm which preferentially supports only the combined in phase light from the MZI. These flanking output arms collect the remaining light, thus keeping this out of phase light from coupling into the slab or radiating, either of which acts to produce the undesirable optical cross talk or degradation of MZI performance from the use of a Y coupler alone.

DETAILED DESCRIPTION OF THE INVENTION

Figure 1:
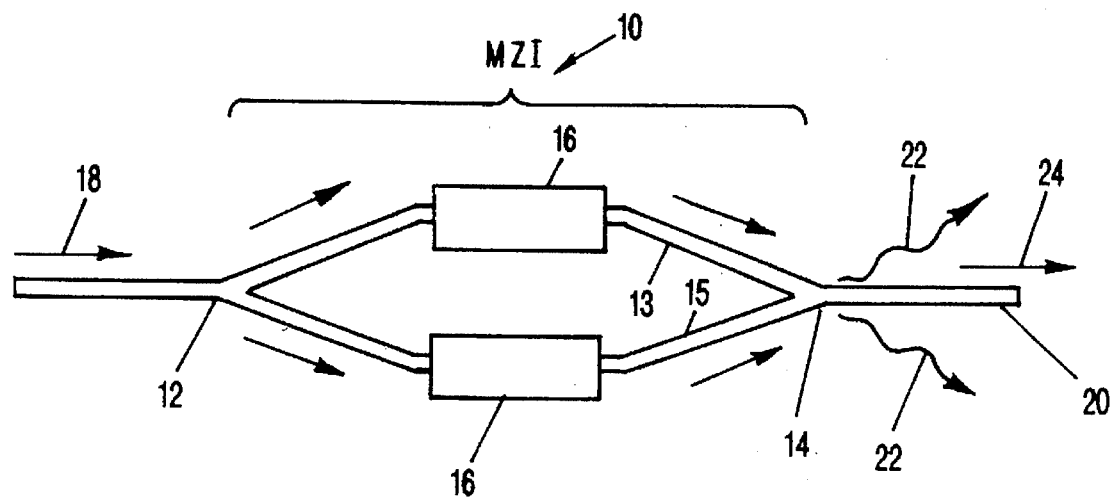
FIG. 1 is a schematic diagram of an MZI utilizing a conventional Y coupler power combiner.
Figure 2:
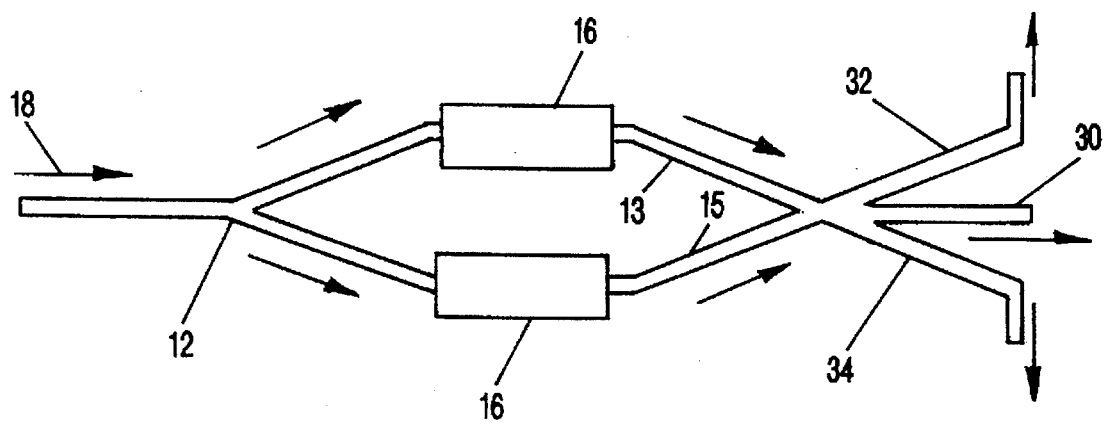
FIG. 2 is a schematic diagram of an MZI utilizing an XY coupler power combiner.

The superior performance of the XY coupler is due to the addition of the two output arms on either side of the central output arm of the coupler at the exit of the central junction of the Y couplers used with conventional Mach-Zehnder Interferometer designs. These added output waveguides, shown as arms 32 and 34 in FIG. 2, channel the out of phase portion of the optical signal away from the main output waveguide 30 without exciting the high-order waveguide slab modes that can severely degrade device performance. This new power coupler can be visualized as a superposition of a traditional waveguide Y-junction and a shallow-angle waveguide cross. In phase light incident on the power coupler from the upper and lower MZI arms 13 and 15 will interfere constructively at the junction and couple into the single on-axis output waveguide 30 while out of phase light will cross at the junction without interference and continue on through to the output arms 32 and 34 of the waveguide cross. The out of phase light is then turned 90° by etched mirrors and scattered out of the optical circuit as shown here. Alternatively, this out of phase light in the outer arms 32 and 34 can be retained in a waveguide and used for additional fan-out, computational or feedback control purposes.

Figure 3A:
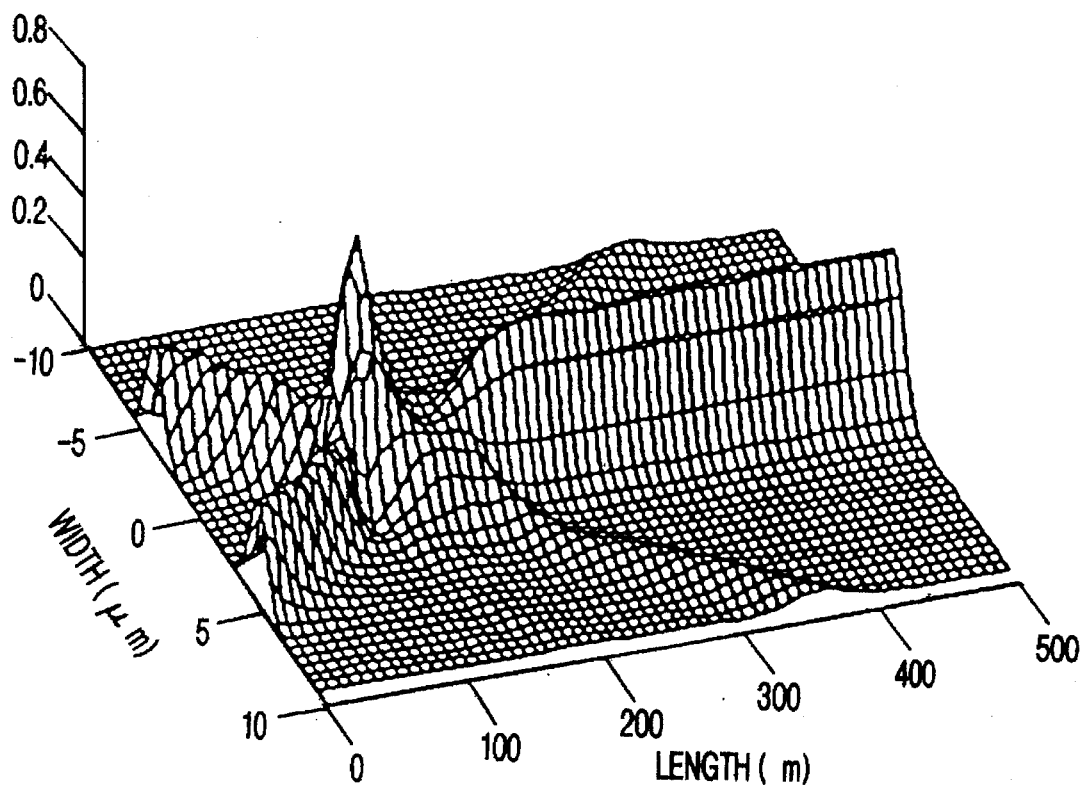
FIG. 3A is a three dimensional graph with the length and width within the XY coupler plotted against simulated beam intensity for an in phase condition.
Figure 3B:
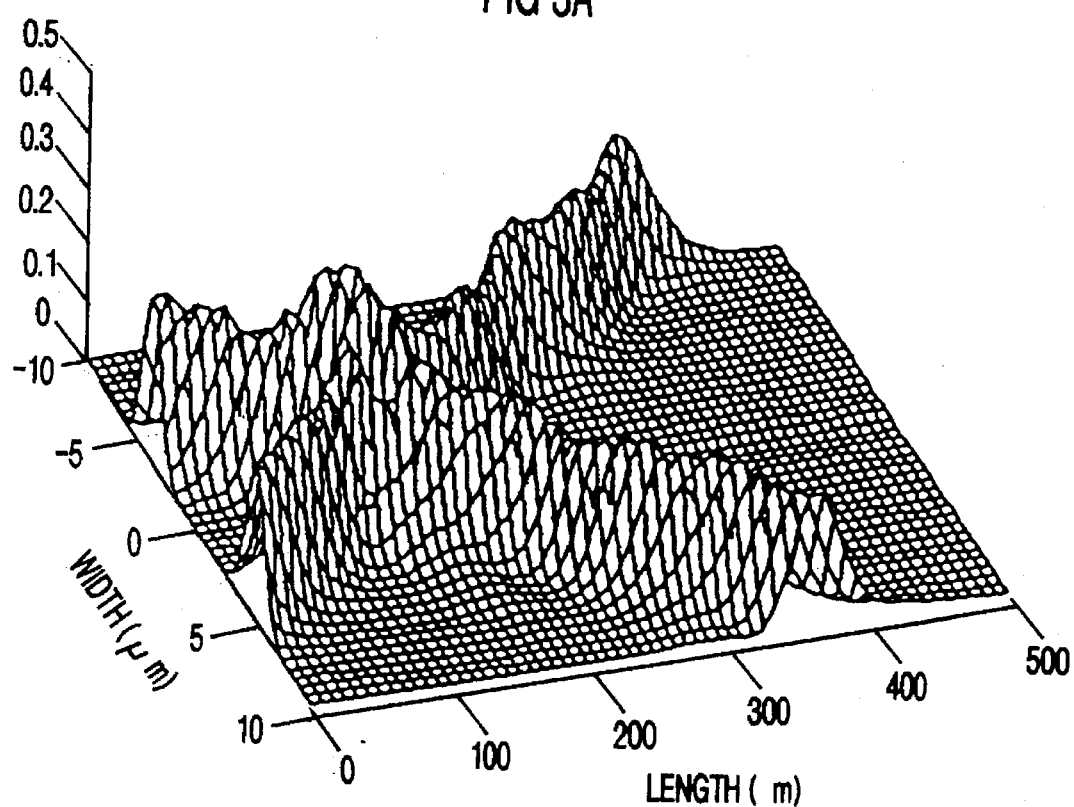
FIG. 3B is a three dimensional graph with the length and width within the XY coupler plotted against simulated beam intensity for an out of phase condition.

Simulated beam intensity profiles in the XY coupler are shown in FIGS. 3A (in-phase conditions) and 3B (out-of-phase conditions). The graphs show beam intensity profiles in arbitrary units at various stations along the coupler. When the light is in phase, almost all the intensity is captured in the central waveguide. When it is out of phase, a quasi-second order mode is excited immediately after the initial combination that then injects the two outer waveguides efficiently, leaving the central waveguide with a near zero intensity.

The XY coupler has a theoretical contrast ratio in the flanking output waveguides of −8.07 dB and an insertion loss to the middle and flanking output waveguides of −1.09 and 0.28 dB respectively. Calculated contrast ratio of the middle output waveguide is infinite due to the perfectly anti-symmetric input conditions used in the "off" state.

At the center of the crossing section of the XY coupler, the rib structure supports only a single guided mode. As a result, anti-symmetric modes excited by out-of-phase light from the input guides are forced to radiate into the outer waveguides at the waist of the coupler. It is the single-mode behavior at the coupler waist that both forces out of phase light into the outer waveguides and makes the XY coupler easy to fabricate, as compare to direction couplers and lateral-mode interference devices, since only the maximum waveguide width is constrained. However, in practice the minimum guide width will be determined by factors external to coupler operation, such as desired mode shape and quality.

To demonstrate the operation of the XY coupler, MZI's were fabricated using GaAs/AlGaAs rib waveguides and tested with TE polarized, 1.32 μm wavelength light. Optical power splitting at the input end of the MZI was achieved using a simple 4° included angle waveguide Y-junction. Phase modulation within the two arms of the MZI was obtained using 2 mm long integrated depletion-edge-translation waveguide phase modulators of the sort described in J. G. Mendoza-Alverez, L. A. Coldren, A. Alping, R. H. Yan, T. Hausken, K. Lee and K. Pedrotti, "Analysis of Depletion Edge Translation Lightwave Modulators," IEEE J. Lightwave Technol., vol. 6, pp. 793–808, 1988. All waveguide structures were fabricated in a single etch step using direct-write electron-beam lithography and chlorine reactive-ion-beam etching using the process described in G. A. Vawter, J. F. Klein and R. A. Leibenguth, "Improved Epitaxial Layer Design for Real-Time Monitoring of Dry-Etching in III-V Compound Heterostructures with Depth Accuracy of ±8 nm," J. Vac. Sci. Technol. A, vol. 12, pp. 1973–1977, 1994. MZIs were built with and without the outer waveguides extending to the cleaved output edge of the device.

Figure 7:
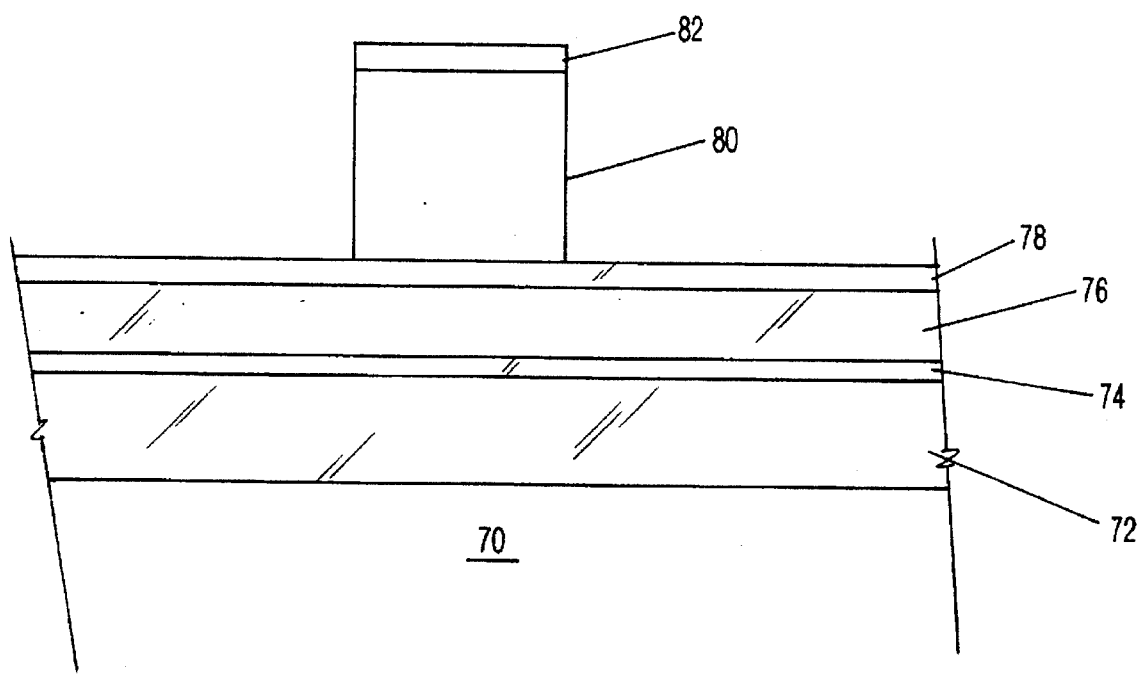
FIG. 7 is a cross section view of a rib waveguide.

The devices were fabricated in a conventional fashion as follows below with reference to the cross section view shown in FIG. 7. This Figure shows the cap 82, the upper cladding layers 80, the upper grade layer 78, the waveguide layers 76, the lower grade layer 74, the lower cladding layers 72, and the substrate 70. The buffer layer between the lower cladding layers 72 and the substrate 70 is not shown in the Figure. Epitaxial layers of (Al,Ga)As were deposited onto a n-type doped GaAs substrate 70 using molecular beam epitaxy (MBE) such that the final layer thicknesses, composition and doping were as shown in Table 1.

TABLE 1

| Layer name | composition | thickness | doping species | doping concentration |
| --- | --- | --- | --- | --- |
| cap | GaAs | 0.2 μm | Be | $2 \times 10^{19}$ cm$^{-3}$ |
| upper cladding | $Al_{0.4}Ga_{0.6}As$ | 1.0 μm | Be | $1 \times 10^{18}$ cm$^{-3}$ |
| | $Al_{0.4}Ga_{0.6}As$ | 0.7 μm | Be | $2 \times 10^{17}$ cm$^{-3}$ |
| grade | $Al_{0.05}Ga_{0.95}As \rightarrow Al_{0.4}Ga_{0.6}As$ | 0.1 μm | Be | $2 \times 10^{17}$ cm$^{-3}$ |
| wave-guide | GaAs | 0.11 μm | Be | $5 \times 10^{17}$ cm$^{-3}$ |
| | GaAs | 0.2 μm | none | — |
| | GaAs | 0.11 μm | Si | $5 \times 10^{17}$ cm$^{-3}$ |
| grade | $Al_{0.4}Ga_{0.6}As \rightarrow Al_{0.05}Ga_{0.95}As$ | 0.1 μm | Si | $2 \times 10^{17}$ cm$^{-3}$ |
| lower cladding | $Al_{0.4}Ga_{0.6}As$ | 0.7 μm | Si | $2 \times 10^{17}$ cm$^{-3}$ |
| | $Al_{0.4}Ga_{0.6}As$ | 1.0 μm | Si | $1 \times 10^{18}$ cm$^{-3}$ |
| buffer | GaAs | 0.2 μm | Si | $2 \times 10^{18}$ cm$^{-3}$ |
| substrate | GaAs | 450 μm | Si | $2 \times 10^{18}$ cm$^{-3}$ |

The minimal processing sequence is as follows:
1) Mask sample using conventional electron-beam resist and exposure techniques with a pattern defining the shape and extent of the 2 μm-wide rib waveguides, y-splitters and xy combiners comprising the desired MZI optical circuit.
2) Etch the rib waveguide through the cap and upper cladding layers using chlorine reactive-ion-beam etching and in-situ endpoint monitoring to stop the etch at the upper waveguide/grade interface.
3) Coat the wafer with either $SiO_2$, $Si_3N_4$ or a polymer such a polyimide. Use conventional photolithographic techniques to remove this coating from the tops or the rib waveguides in the phase modulator areas.
4) Deposit an ohmic contact metal, such as Be/Au or other p-type ohmic metalizations, onto the regions defined as phase modulators. Photolithographic techniques are again used here.
5) Thin the wafer by mechanically lapping and polishing the backside to a total thickness of ~125 μm.
6) Deposit an ohmic contact metal to the backside of the wafer, such as Ge/Au/Ni/Au or other.
7) Heat entire wafer to 350°→450° C. to alloy the contacts with the GaAs material and form high-quality contacts.
8) Cleave completed devices into die for testing and packaging.

Further steps may be added, such as isolation etches or implants, to enhance overall MZI performance. These are not essential to the fabrication of am MZI with an xy combiner.

Figure 4:
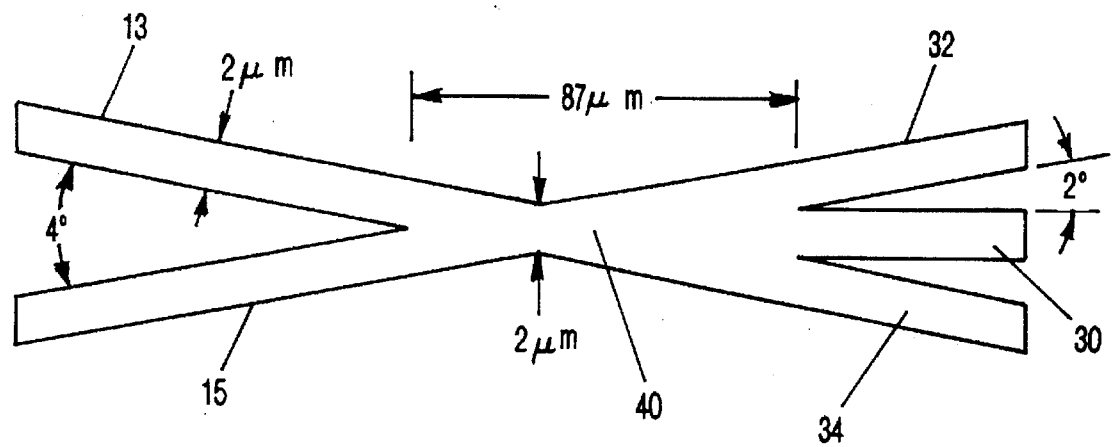
FIG. 4 is a top view schematic of an rib-waveguide XY coupler.

Extending the outer waveguides to the output cleave allowed for measurement of optical switching from the inner to the outer guides while terminating the outer waveguides at an etched 45° mirror port prior to the cleave simplified fiber coupling of the MZI for operation as a conventional 2-port modulator. However, sufficient length of outer waveguide was left in place to ensure that the inner and outer waveguides were fully decoupled at the point of termination. As control devices, standard MZIs with conventional Y junction power combiners were fabricated on the same chip using the identical waveguide design as the XY coupler MZIs and a 4° included angle at the output Y combiner. Total length of the integrated MZIs was only 4.3 mm. The dimensions of the XY coupler are shown in FIG. 4.

Figure 5:
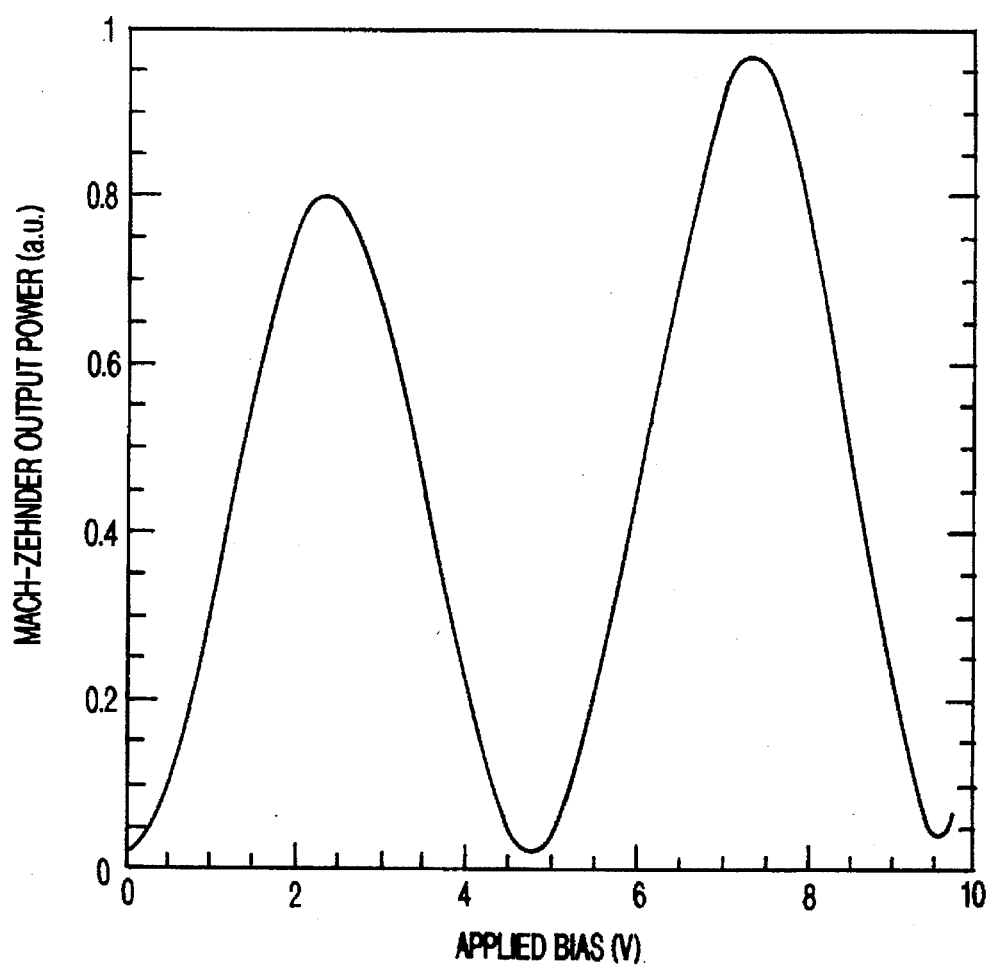
FIG. 5 is a graph of the measured modulation performance of the XY coupler of FIG. 4 with the MZI output performance in arbitrary units plotted as a function of the applied bias to one of the phase shifters in the MZI.

Completed MZIs with the XY coupler showed a 15.5 dB modulation depth with 2.6 Volt bias swing on one arm of the MZI as shown in FIG. 5. Data in this Figure are from an MZI with terminated outer waveguides. The limitation on the modulation depth appears to be a small amount of optical power coupled into a $TE_{01}$ mode in the central output waveguide. Measurements of straight waveguides adjacent to the MZIs indicated that the waveguides, as fabricated, support both the $TE_{00}$ and $TE_{01}$ modes. This is most likely due to a slight overetch of the rib waveguide. The presence of a double-moded rib waveguide implies that the waist of the XY coupler is also double-moded, allowing for enhanced coupling of out-of-phase light into the central output waveguide. Measured insertion loss of the XY coupler was −2.8 dB, 1.71 dB more than the calculated value, while insertion loss of the Y-junction splitter was measured at −2.3 dB. This additional XY coupler insertion loss is likely due to scattering at imperfections with the coupler. Straight waveguide propagation loss was measured at 1.9 cm$^{-1}$ using the Fabry-Perot interference technique and an assumed facet reflectivity of 0.32.

Testing of the control MZIs with a conventional Y junction output coupler showed very little actual power modulation. These devices functioned as mode converters with the output light switching form $TE_{00}$ to $TE_{01}$ with a 2.6 Volt applied bias swing. This mode switching behavior is expected with double-moded rib waveguides due to the efficient coupling of out-of-phase input light into odd symmetry output light. It is of greater interest that the XY coupler demonstrates better than 15.5 dB modulation with the same double-moded waveguides. Clearly the XY configuration is an effective mode filter, switching $TE_{01}$ light to the outer waveguide pair while placing $TE_{00}$ light in the central output waveguide.

Figure 6A:
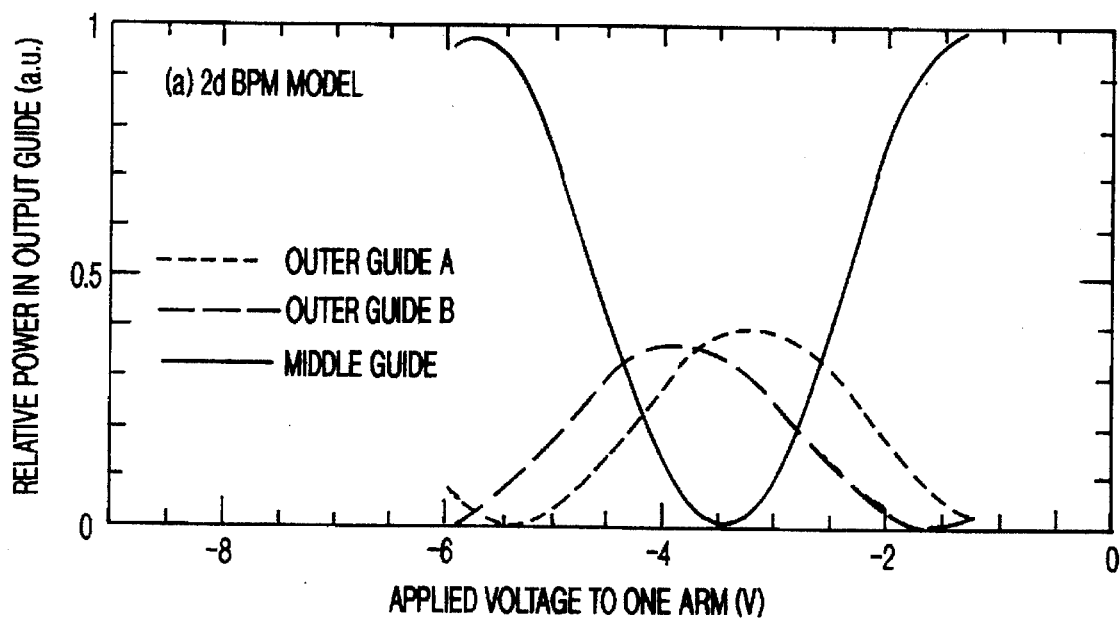
FIGS. 6A and 6B are graphs showing modeled and actual, respectively, relative power in the three output arms of the XY coupler of FIG. 4 as a function of applied bias voltage to one arm of the MZI.
Figure 6B:
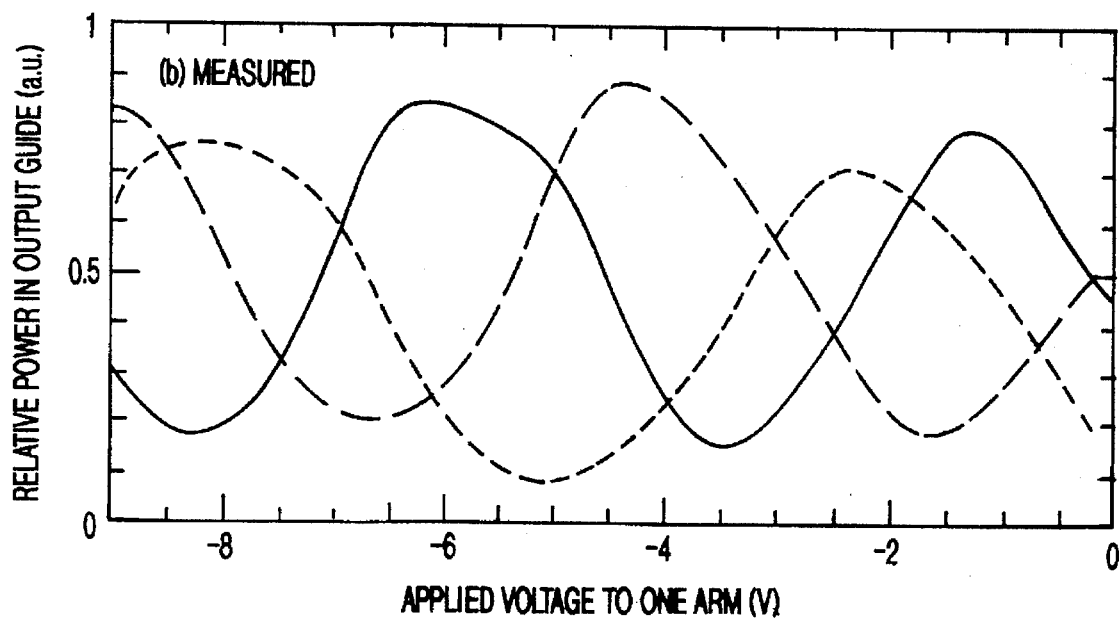

Switching behavior of the XY coupler was examined using devices with all three waveguides continued out to the cleaved output edge. Ideally power in the two outer guides switches nearly inversely with power in the middle guide. FIG. 6A shows simulations of the relative power in each waveguide versus applied bias to the MZI. The two outer arms are predicted to carry maximum power at close to the same voltage, peaking at roughly 40% of the maximum power carried in the middle waveguide. The slightly asymmetric switching behavior of the two outer output arms is caused by multimode propagation within portions of the XY coupler. Since the crossed waveguide structure is only single moded near the coupler waist, a relative phase difference slightly less (or greater) than 90° between the two input arms can preferentially excite a combination of modes within the XY coupler than will couple relatively more light into the one of the outer exit guides as compare to the other. The slight difference in height of the curves for the outer arms is due to accumulated numerical error. Measured switching behavior is shown in FIG. 6B. Although FIG. 6B does show strong switching behavior, the outer guides do not switch as closely together as would be expected from the simulation, and all three waveguides carry close to the same peak power. It is believed that this is a consequence of the double-moded waveguide system. In the double-moded XY coupler, the MZI excites linear combinations of $TE_{00}$ and $TE_{01}$ modes which remain guided throughout the length of the device such that the phase velocity difference between these two modes will influence the output coupling. The reduced modulation depth of this device compared to the MZI results shown in FIG. 5 is due to process-induced asymmetry at the Y-splitter.

New designs for the rib waveguides in the XY coupler will place the $TE_{01}$ mode much further into cut-off, allowing for single-mode waveguides to be fabricated with more relaxed processing constraints. Although an MZI circuit has been used herein to demonstrate operation of the XY coupler, the use of the XY coupler is not limited thereto. It is suitable for use in a wide variety of PICs where phase sensitive coherent power combining of light is needed but where the generation of radiated light resulting from destructive interference is not desired. The true scope of protection sought for this invention is to be found in the claims appended below.

We claim:

1. An integrated optical coupler comprising:

two input waveguide arms that converge at the center of a central crossing section;

a central output waveguide arm emanating from the central crossing section;

two flanking waveguide output arms divergingly emanating from the central crossing section on either side of the central output waveguide arm;

and means to supply the input arms of the coupler with coherent phase-modulated light.

2. The optical coupler of claim 1 wherein the means to supply comprises a 3 dB power splitter that divides a single optical supply waveguide into two equal power optical supply waveguides that supply the input arms of the coupler.

3. The optical coupler of claim 2 wherein the means to supply includes a phase shifter on at least one of the two equal power optical supply waveguides.

4. The optical coupler of claim 1 wherein the input and output waveguides are etched rib waveguides.

5. The optical coupler of claim 1 wherein the central output waveguide arm is configured to preferentially support a single mode of the coherent light produced by constructive interference of in-phase light supplied to the input arms of the coupler.

6. The optical coupler of claim 1 wherein the flanking waveguide output arms are configured to collect light other than in-phase light supplied to the central output waveguide arm.

7. The optical coupler of claim 4 wherein the coupler additionally comprises a semiconductor substrate beneath the etched rib waveguides.

8. The optical coupler of claim 1 wherein the input arms and the two flanking output arms are symmetric about an axis defined by the the central output waveguide.

9. The optical coupler of claim 1 wherein the waveguides of the coupler all have the same width and height.

* * * * *